United States Patent
Rastegar

(10) Patent No.: US 10,374,213 B2
(45) Date of Patent: Aug. 6, 2019

(54) LIQUID RESERVE BATTERIES FOR MUNTIONS

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 74 days.

(21) Appl. No.: 14/590,955

(22) Filed: Jan. 6, 2015

(65) Prior Publication Data

US 2015/0147601 A1    May 28, 2015

Related U.S. Application Data

(63) Continuation-in-part of application No. 13/350,907, filed on Jan. 16, 2012.

(51) Int. Cl.
| | |
|---|---|
| *H01M 2/38* | (2006.01) |
| *H01M 6/36* | (2006.01) |
| *H01M 6/50* | (2006.01) |

(52) U.S. Cl.
CPC ............. *H01M 2/38* (2013.01); *H01M 6/36* (2013.01); *H01M 6/5038* (2013.01)

(58) Field of Classification Search
CPC .... H01M 6/30–385; H01M 2/38; H01M 6/36; H01M 6/5038; H01M 10/50
USPC ..... 429/48, 115, 120; 137/68.13, 68.23, 910
See application file for complete search history.

(56) References Cited

U.S. PATENT DOCUMENTS

| | | | | |
|---|---|---|---|---|
| 2,824,164 A | * | 2/1958 | Bauman | H01M 6/38 137/68.13 |
| 3,173,811 A | * | 3/1965 | Amiet | H01M 6/38 429/115 |
| 3,897,942 A | * | 8/1975 | McNamee | F16J 3/047 267/122 |
| 4,650,732 A | * | 3/1987 | Weber | H01M 6/32 165/300 |
| 2009/0226809 A1 | * | 9/2009 | Vu | H01M 2/166 429/220 |
| 2012/0215270 A1 | * | 8/2012 | Rastegar | A61N 1/3975 607/5 |
| 2012/0301754 A1 | * | 11/2012 | Rastegar | H01M 6/36 429/52 |
| 2013/0183551 A1 | * | 7/2013 | Rastegar | H01M 6/36 429/51 |

* cited by examiner

*Primary Examiner* — Miriam Stagg
*Assistant Examiner* — Claire L Roe

(57) ABSTRACT

A liquid reserve battery including: a collapsible storage unit having a liquid electrolyte stored therein; a battery cell having an inlet in communication with an outlet of the collapsible storage unit, the battery cell having gaps dispersed therein; a first pyrotechnic material disposed adjacent the collapsible storage unit such that initiation of the first pyrotechnic material provides pressure to collapse the collapsible storage unit to heat and force the liquid electrolyte through the outlet and into the gaps; and one or more heat exchangers disposed between the outlet of the collapsible storage unit and the inlet of the battery cell.

11 Claims, 9 Drawing Sheets

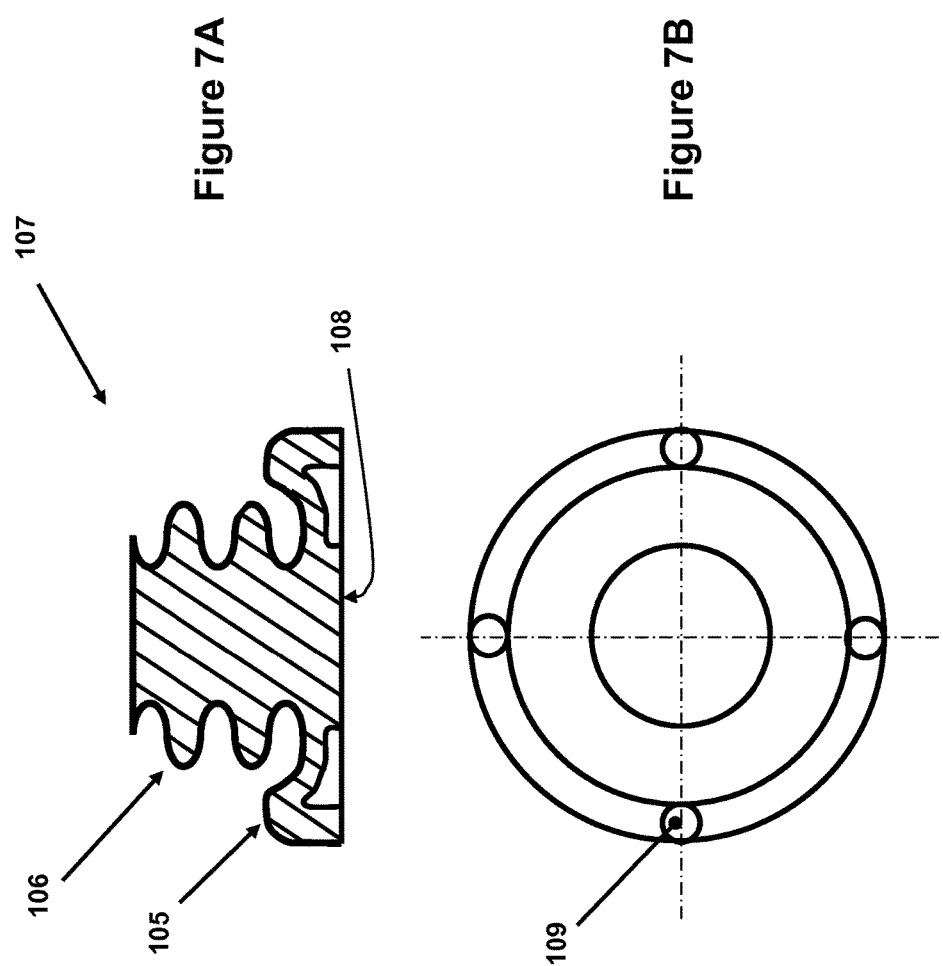

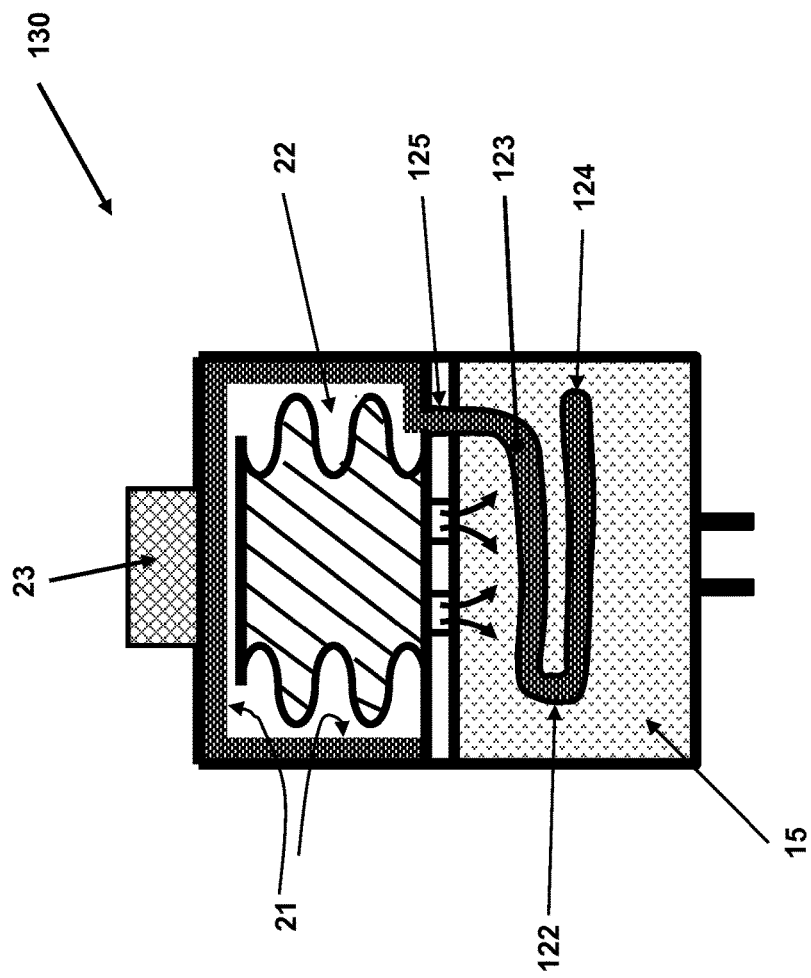

LIQUID RESERVE BATTERIES FOR MUNITIONS

CROSS REFERENCE TO RELATED APPLICATION

This application is a continuation-in-part of U.S. application Ser. No. 13/350,907, filed on Jan. 16, 2012, the entire contents of which is incorporated herein by reference.

BACKGROUND

1. Field

The present invention relates generally to reserve power sources for munitions; and more particularly to liquid reserve batteries for use in gun-fired munitions, sub-munitions, mortars and the like.

2. Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the $Li(Si)/FeS_2$ or $Li(Si)/CoS_2$ couples. Some batteries also employ anodes of $Li(Al)$ in place of the $Li(Si)$ anodes. Insulation and internal heat sinks are used to maintain the electrolyte in its molten and conductive condition during the time of use.

The second type includes the so-called liquid reserve batteries in which the electrodes are fully assembled for cooperation, but the liquid electrolyte is held in reserve in a separate container until the batteries are desired to be activated. In these types of batteries, since there is no consumption of the electrodes under these circumstances, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms or by the high-G firing setback shock. In these batteries, the projectile spin or a wicking action of the separator is generally used to transport the electrolyte into the battery cells.

In recent years, there have been a number of advancements in reserve battery technologies. Among these advances are superhydrophobic nanostructured materials, bimodal lithium reserve battery, and ceramic fiber separator for thermal batteries. In one liquid reserve battery technology under development, "superhydrophobic nanostructured material" is used in a honeycomb structure to keep the electrolyte separated from the battery cell. "Electrowetting" is achieved by the application of a trigger voltage pulse. The electrolyte can then penetrate the honey comb structure and come into contact with the electrodes, thereby making the cell electrochemically active.

The currently available liquid reserve batteries of all types and designs and those that are known to be under development materials suffer from several basic shortcomings for munitions applications, including the following:

1. The main shortcoming of currently available liquid reserve batteries of all types and designs is their very poor performance at low temperatures, usually below −25 deg. F. and for becoming almost non-functional at lower temperatures. In most munitions applications, however, the batteries are required to be operational at significantly lower temperatures of −40 deg. F. and sometimes lower, and sometimes after storage at temperatures as low as −65 deg. F.
2. The second shortcoming of liquid reserve batteries is their relatively slow rise time, particularly at low temperatures. Researchers have, however, attempted to minimize this shortcoming by, for example, by injecting pressurized electrolyte into the battery cells; using wicks to increase the electrolyte diffusion rate; utilize spin and/or setback to move electrolyte into the battery cell to increase; etc. These methods have improved the liquid reserve battery rise time, but have not resolved the problems at low temperatures.

SUMMARY

A need therefore exists for liquid reserve batteries that can effectively operate with good performance at low temperatures, particularly at temperatures below −25 to −40 deg. F. and even after being stored at temperatures as low as −65 deg. F.

A need also exists for liquid reserve batteries that do not only operate effectively operate with good performance at low temperatures, but are also capable of becoming operational very rapidly following activation, i.e., to have a so-called short rise time to full or near full capacity.

In particular, there is a need for such liquid reserve batteries for gun-fired munitions, mortars and the like that are inactive prior to launch and become active during or after certain amount of time following launch or other similar linear or rotary (spin) acceleration or deceleration event. Such liquid reserve batteries must be capable of withstanding high firing accelerations; have very long shelf life, preferably beyond 20 years; and that can be used in munitions with any spin rates, including very low or no spin to very high spin rate munitions.

In particular, there is a need for relatively small reserve power sources for munitions, particularly for smaller caliber munitions, that can withstand very high firing accelerations; have very long shelf life, preferably beyond 20 years; and that can be in munitions with very high spin rates.

Such liquid reserve power sources are preferably initiated as a result of the munitions firing using inertial igniters such as those disclosed in U.S. Pat. Nos. 7,437,995; 7,587,979; 7,587,980; 7,832,335 and 8,061,271 and U.S. patent application Ser. Nos. 12/774,324; 12/794,763; 12/835,709; 13/180,469; 13/207,280 and 61/551,405 (the full disclosure of each of which being incorporated herein by reference) or piezoelectric-based inertial igniters such as those disclosed in U.S. Pat. No. 8,024,469 and U.S. patent application Ser. Nos. 13/186,456 and 13/207,355 the full disclosure of each of which being incorporated herein by reference) or other electrical initiators. The piezoelectric-based inertial igniters, particularly those that can provide relatively long initiation delay, are highly advantageous since by delaying the initiation, the time period in which the battery is subjected to high acceleration/deceleration levels is reduced or even preferably eliminated. The reserve battery may also be activated following launch when its power is needed, which may in certain cases be long after launch and even landing. The initiation devices to be used must also be capable to operate safely by differentiating all-fire and various no-fire events such as accidental drops and vibration and impact during transportation and loading and even nearby explosions. The task of differentiating all-fire conditions from no-fire conditions is preferably performed without the use of external acceleration sensors and the like, and/or the use of external power sources.

An objective of the present invention is to provide new types of liquid reserve batteries (power sources) that can operate efficiently at very low temperatures and that can be activated and brought to operational power levels rapidly. Such liquid reserve batteries can also be fabricated in small sizes suitable for use in small and medium caliber munitions, sub-munitions and the like.

Another objective of the of the present invention is to provide new types of liquid reserve batteries and methods of their design and construction such that they could be activated by the initiation of pyrotechnic materials, thereby allowing their liquid electrolyte to be heated prior and even after injection into the battery cell to allow activation at very low temperatures and faster activation.

Another objective of the present invention is to provide new types of liquid reserve batteries and methods of their design and construction such that they could be activated by the initiation of pyrotechnic materials, and the pressure generated by the initiation of the pyrotechnic material be used to rapidly inject the (heated) liquid electrolyte into the battery cell cavities to achieve very fast battery activation.

In one disclosed liquid reserve battery design, the aforementioned pressure generated by the initiation of the pyrotechnic material is used to generate vacuum in a region of the battery to assist evacuation of the gasses filling the battery cell cavities as the electrolyte liquid enters to fill these cavities, thereby minimizing their resistance to inflow of the liquid electrolyte, further reducing the battery rise time. The provided vacuum (suction) is particularly effective when the liquid electrolyte is being injected into the battery cell cavities under pressure.

To ensure safety and reliability, the liquid reserve power source withstand and not initiate during acceleration events which may occur during manufacture, assembly, handling, transport, accidental drops, etc. Additionally, once under the influence of an acceleration profile particular to the firing of the ordinance, i.e., an all-fire condition (with or without a programmed delay period), the reserve battery must initiate with high reliability.

The disclosed reserve power sources are preferably provided with hermetically sealed packaging. The disclosed reserve power sources would therefore be capable of readily satisfying most munitions requirement of 20-year shelf life requirement and operation over the military temperature range of −65 to 165 degrees F., while withstanding high G firing accelerations.

In many applications, the liquid reserve battery is required to provide full or close to full power very short time after initiation. This capability is particularly challenging when the reserve battery is at very low temperatures such as the aforementioned −65 degrees F. For this reason, the electrolyte must be at a relatively high temperature before it is injected into the battery cell since it is also required to provide the required amount of heat to rapidly heat the cell elements while staying warm enough to ensure proper operation of the reserve power source.

BRIEF DESCRIPTION OF THE DRAWINGS

These and other features, aspects, and advantages of the apparatus of the present invention will become better understood with regard to the following description, appended claims, and accompanying drawings where:

FIGS. 7A and 7B illustrate cross-sectional and base views, respectively, of an example of the design of the liquid electrolyte storage unit with its integral heat exchanger component of the liquid reserve battery embodiment of FIG. 6.

FIG. 9 illustrates a sectional schematic of a fifth variation of the pyrotechnic activated liquid reserve battery of FIG. 1 with battery cell heated internally by the burning of heat generating pyrotechnic materials.

DETAILED DESCRIPTION

Figure 1:
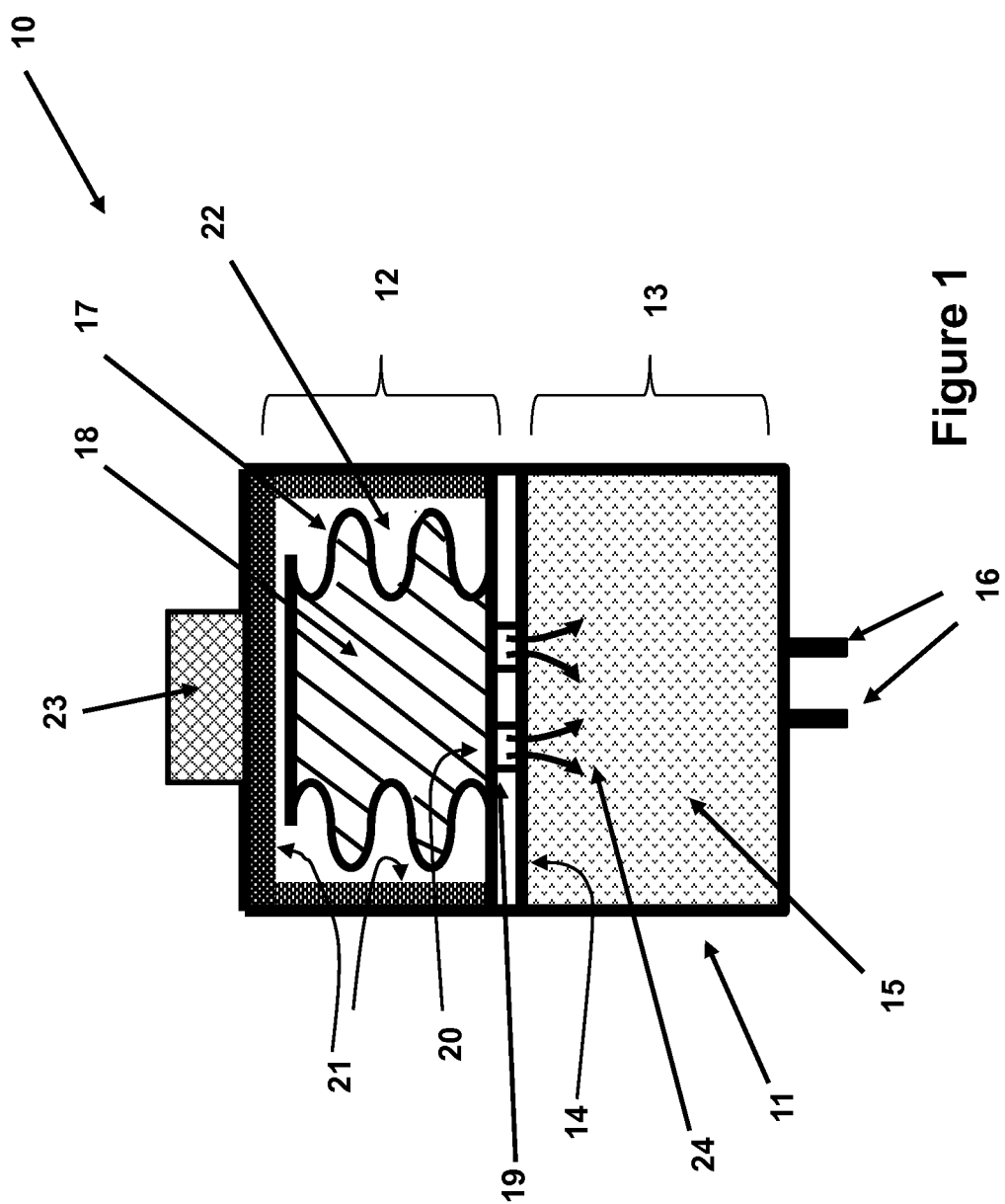
FIG. 1 illustrates a sectional schematic of the first embodiment of the pyrotechnic activated liquid reserve battery for fast activation and high low-temperature performance.

An embodiment 10 of the present novel pyrotechnic charge activated liquid reserve batteries is shown in the cross-sectional schematic of FIG. 1. The novel pyrotechnic charge activated liquid reserve battery, hereinafter also referred to as simply "liquid reserve battery" consists of a body 11, which is divided into two compartments 12 and 13. The compartment 12 is where the liquid electrolyte and pyrotechnic material are located. The compartment 13 is where the battery electrodes are spaced with gaps to accommodate the battery liquid electrolyte, the entire combined volume of which is indicated by the numeral 15 and hereinafter will be referred to as a "battery cell". The compartments 12 and 13 can be divided by a single relatively rigid separating plate 14. The battery body 11, the dividing plate 14 and other structures of the battery can be made out of relatively non-corrosive metal such as stainless steel. The liquid reserve battery 10 terminals are indicated by numeral 16. The terminals 16 of the liquid reserve battery 10 may be located at any convenient location, such as being positioned on a surface of the battery cell compartment 13 to avoid running wires to them through compartment 12.

In general, the body 11 and the compartments 12 and 13 of the liquid reserve battery 10 may be formed to have any convenient shape, such as to match an available space in the munitions.

In the compartment 12 is located at least one collapsible (e.g., bellow like) storage unit 17 within which the liquid electrolyte 18 is stored. At least one, which can be several, outlet holes 19 are provided on the relatively rigid separating plate 14. The outlet holes 19 are sealed by relatively thin, such as metallic, diaphragms 20. Pyrotechnic materials 21, such as in a layer configuration as shown in the schematic of FIG. 1 are provided in the sealed volume 22 between the collapsible liquid electrolyte storage unit 17 and the compartment 12 walls. The liquid reserve battery 10 is also provided with an initiation device 23 for igniting the pyrotechnic materials 21. The initiation device 23 is either of inertial, electrical, or other available types appropriate for the application at hand (e.g., see those listed above) which can, for example, ignite the pyrotechnic material upon the occurrence of an acceleration with at least a predetermined duration and magnitude.

The liquid reserve battery 10 is activated by the initiation device 23 igniting the pyrotechnic materials 21. The burning pyrotechnic material 21 generates heat and heats the stored liquid electrolyte 18. The burning pyrotechnic material 21 also generates pressure within the sealed volume 22 by heating the enclosed gasses as well as by generating new gasses. The generated pressure would then act over the surface of the at least one collapsible liquid electrolyte storage unit 17, forcing it to collapse, thereby forcing the pressurized liquid electrolyte 18 to rupture the diaphragm(s) 20 separating it from the battery cell 15 and rapidly injecting the heated liquid electrolyte 18 into the cavities between the battery cell 15 electrodes as shown by the arrows 24. The liquid reserve battery 10 is thereby activated very rapidly without the need for wicks or munitions spin or other additional means. In addition, the heating of the liquid electrolyte 18 (even if it is turned solid due to extreme cold temperatures) would allow activation of the liquid reserve battery 10 at very cold temperatures and ensures its high performance. The heating of the liquid electrolyte 18 would also enhance its diffusion rate inside the battery cell 15.

The collapsible liquid electrolyte storage unit 17 can be configured with a relatively large surface area to allow for rapid transfer of heat to the liquid electrolyte 18. The liquid electrolyte storage unit 17 can also be configured to deform plastically under the generated pressure so that once the pressure has subsided, only a minimal amount of the liquid electrolyte 18 is returned back to the storage unit 17. Alternatively, particularly when the size of the battery allows, one-way valves (not shown) may be used to prevent the return of the liquid electrolyte 18 back to the liquid electrolyte storage unit 17. Such fluid one-way valves are well known in the art, such as the use of sealing flaps or balls positioned in an orifice.

As indicated previously, the burning of the provided pyrotechnic material 21 serves the following purposes. Firstly, it is used for battery activation, i.e., to release the stored liquid battery electrolyte 18 into the battery core 15. Secondly, it generates heat, which is used to heat the liquid electrolyte 18 to allow the battery to function at very low temperatures and at the same time enhance its penetration rate into the battery cell 15 as well as its rate of diffusion. Thirdly, the pressure generated by the initiation of the pyrotechnic material 21 is used to inject the liquid electrolyte 18 into the battery cell 15 under pressure. Fourthly, as is shown in a later embodiment, the pressure generated by the initiation of the pyrotechnic material 18 can also be used to generate vacuum to assist outflow of gasses occupying the voids inside the battery cell 15 between the electrodes that are to be filled with the liquid electrolyte 18, thereby minimizing resistance to the inflow of the liquid electrolyte 18 into the battery cell 15.

The time that it takes for a liquid reserve battery to become fully active following the activation of the initiation device 23, also called the battery "rise time" is dependent on the time that it takes for the liquid electrolyte 18 to fill the battery cell 15 cavities and begin to interact with the battery electrodes. The following two alternative embodiments are modifications to embodiment 10 of the present pyrotechnic activated liquid reserve batteries to achieve significantly faster rise time.

Figure 2:
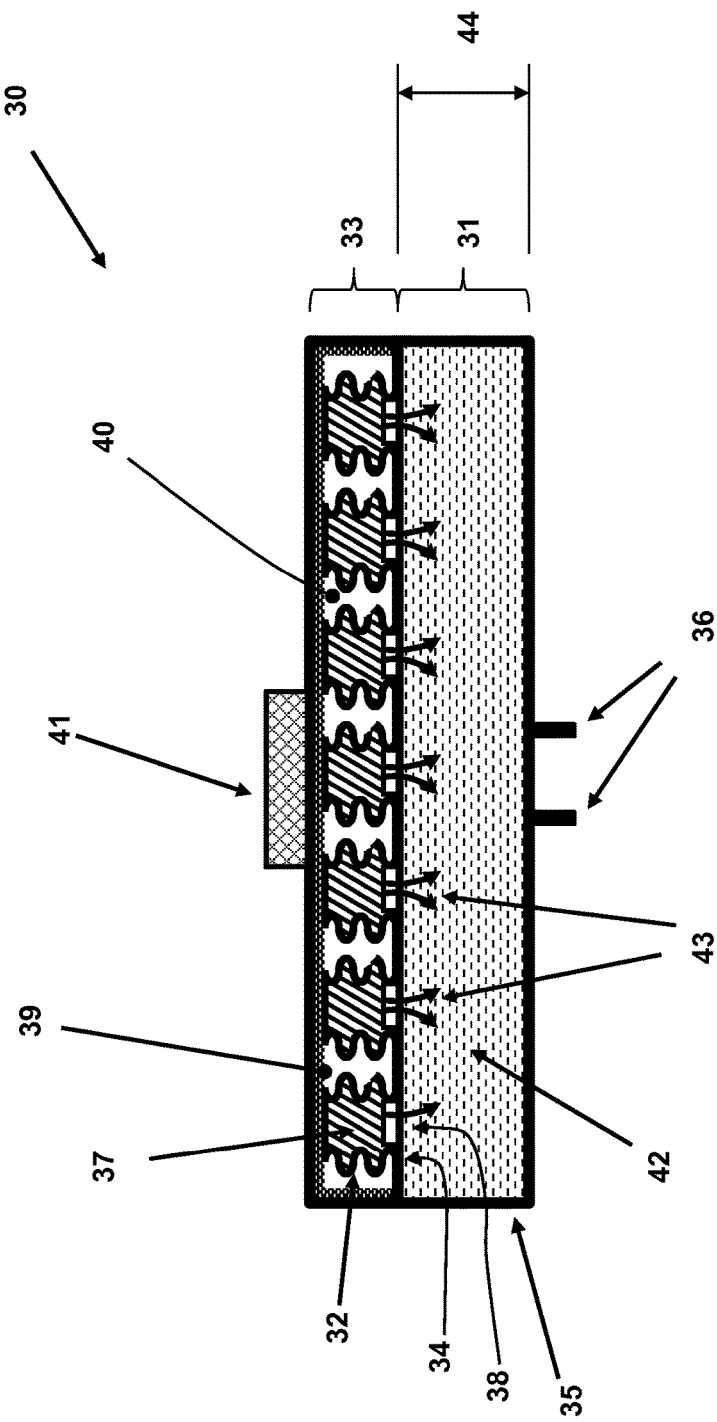
FIG. 2 illustrates a sectional schematic of a first variation of the pyrotechnic activated liquid reserve battery of FIG. 1.

A first modification to the embodiment 10 of FIG. 1 is illustrated schematically in the cross-sectional view of FIG. 2 and is indicated as the embodiment 30. In the embodiment 30, the distance that the liquid electrolyte has to penetrate inside the battery cell is significantly reduced. This is accomplished as shown in FIG. 2 by significantly reducing the height of the battery cell compartment 31 (in the indicated vertical direction—44), while distributing the battery core electrodes over a significantly larger surface area of the battery cell compartment (e.g., in a direction orthogonal to the vertical direction). To shorten the path of liquid electrolyte travel within the battery cell 42, it is also required that the liquid electrolyte be released over as large a surface of the battery cell 42 as possible. To this end, a number of collapsible liquid electrolyte storage units 32 are distributed over the plate separating the liquid electrolyte and pyrotechnic material compartment 33.

The battery compartment 31 is still where the battery electrodes are spaced with gaps to accommodate the battery liquid electrolyte. The compartments 31 and 33 can be divided similarly by a single relatively rigid separating plate 34. The liquid reserve battery body 35, the dividing plate 34 and other structures of the battery can be made out of relatively non-corrosive metal such as stainless steel. The liquid reserve battery 30 terminals are indicated by numeral 36. The terminals 36 of the liquid reserve battery 30 may be located at any convenient location, such as being positioned on a surface of the battery cell compartment 31 to avoid running wires to the electrodes 36 through the compartment 33.

In general, the body 35 and the compartments 31 and 33 of the liquid reserve battery 30 may be formed into any convenient shape, such as to match the available space in the munitions.

In the compartment 33 are located a plurality of collapsible (e.g., bellow like) storage units 32 within which the liquid electrolyte 37 are stored. The collapsible storage units 32 are preferably relatively small but numerous, and can be uniformly distributed over the surface of the dividing plate 34 or non-uniformly distributed depending on the corresponding shape/volume of the compartment 31. The collapsible storage units 32 must obviously contain enough liquid electrolytes 37 to flood the entire battery cell 42 cavities. Each collapsible storage unit 32 is provided with at least one outlet hole 38 in the dividing plated 34. The outlet holes 38 are sealed by relatively thin, such as metallic, diaphragms similar to the embodiment 10 of FIG. 1 (not shown). Pyrotechnic materials 39, preferably in a layer configuration as shown in the schematic of FIG. 2 are provided in the sealed volume 40 between the collapsible liquid electrolyte storage units 32 and the compartment 33 walls. As discussed above with regard to the bellows, the pyrotechnic materials 39 can be uniformly distributed in the compartment 33 or non-uniformly depending on the distribution of the corresponding collapsible storage units 32 and/or corresponding shape/volume of the compartment 31. The liquid reserve battery 30 is also similarly provided with an initiation device 41 for igniting the pyrotechnic materials 39. The initiation device 41 is either of inertial, electrical, or other available types appropriate for the application at hand (such as those listed above).

The liquid reserve battery 30 is activated by the initiation device 41 igniting the pyrotechnic materials 39. The burning pyrotechnic material 39 generates heat, which heats the stored liquid electrolyte 37 in all the collapsible storage units 32. The burning pyrotechnic material 39 also generates pressure within the sealed volume 40 by heating the enclosed gasses as well as by generating new gasses. The generated pressure would then act over the surfaces of all the collapsible liquid electrolyte storage units 32, forcing them to collapse, thereby forcing the pressurized and heated liquid electrolytes 37 to rupture the diaphragms separating them from the battery cell 42 and rapidly injecting the heated liquid electrolytes 37 into the cavities between the battery cell 42 electrodes as shown by the arrows 43. The liquid reserve battery 30 is thereby activated very rapidly without the need for wicks or munitions spin or other additional means. In addition, the heating of the liquid electrolyte 37 (even if it is turned solid due to extreme cold temperatures) would allow activation of the liquid reserve battery 30 at very cold temperatures and ensures its high performance. The heating of the liquid electrolyte 37 would also enhance its diffusion rate inside the battery cell 42.

The collapsible liquid electrolyte storage units 32 can be configured with a relatively large surface area to allow for rapid transfer of heat to the liquid electrolytes 37. The liquid electrolyte storage units 32 can also be configured to deform plastically under the generated pressure so that once the pressure has subsided, only a minimal amount of the liquid electrolyte 37 is returned back to the storage unit 32. Alternatively, particularly when the size of the battery allows, one-way valves (not shown) may be used to prevent the return of the liquid electrolyte 37 back to the liquid electrolyte storage unit 32. Such fluid one-way valves are well known in the art.

As indicated previously, the burning of the provided pyrotechnic material 21 serves the following purposes. Firstly, it is used for battery activation, i.e., to release the stored liquid battery electrolyte 37 into the battery cell 42. Secondly, it generates heat, which is used to heat the liquid electrolyte 37 to allow the battery to function at very low temperatures and at the same time enhance its penetration rate into the battery cell 42 as well as its rate of diffusion. Thirdly, the pressure generated by the initiation of the pyrotechnic material 39 is used to inject the liquid electrolyte 37 into the battery cell 42 under pressure. Fourthly, as it is shown in the next embodiment of the present invention, the pressure generated by the initiation of the pyrotechnic material 39 can also be used to generate vacuum to assist outflow of gasses occupying the voids inside the battery cell 42 between the electrodes that are to be filled with the liquid electrolyte 18, thereby minimizing resistance to the inflow of the liquid electrolyte 37 into the battery cell 42.

It will be appreciated by those skilled in the art that the rise time of the present pyrotechnic activated liquid reserve battery embodiments 10 and 30 of FIGS. 1 and 2, respectively, is dependent on the length of the path of travel of the liquid electrolyte inside the battery cell. In the embodiment 30 of FIG. 2, the electrodes in the battery cell 42 are considered to be positioned and spaced essentially in the vertical direction, thereby resulting in the void spaces to be filled with the liquid electrolytes to be essentially directed in the vertical direction. As a result, the maximum length of the path that the liquid electrolyte 37 that is injected into the battery cell 42 has to travel becomes essentially the height 44 of the battery cell compartment 31. This is the case since a considerable number of collapsible liquid electrolyte storage units 32 are considered to be distributed over the entire surface of the dividing plate 34. As a result, the pressurized and heated liquid electrolyte 37 has to travel a very short distance 44 to fill the cavities between the battery cell 42 electrodes, thereby the liquid reserve battery 30 can be activated very rapidly.

It is thereby shown that for the same volume of the battery cell, i.e., essentially for the same amount of stored electrochemical energy in a liquid reserve battery, by reducing the depth of the battery cell while increasing its electrolyte facing surface area, as described above and shown in the embodiment of FIG. 2, the rise time of the liquid reserve battery is significantly decreased. In the embodiment 30, by distributing many collapsible liquid electrolyte storage units 32 over the dividing plate 34, the liquid electrolyte flooded surface area of the battery cell 42 is increased while the depth of the (44 in FIG. 2) of the battery cell 42, i.e., the distance that the liquid electrolyte inflow has to travel, is decreased. In addition, the total surface area of the collapsible liquid electrolyte storage units 32 is also increased, thereby allowing more heat to be transferred to the liquid electrolyte 37 following pyrotechnic material initiation and while being injected into the battery cell 42 cavities. Thus, the heated liquid electrolyte is injected into the battery cell 42 over a significantly larger area and has to travel significantly shorter paths to engulf the battery cell electrodes. As a result, the activation or rise time of the reserve battery is significantly reduced.

Figure 3:
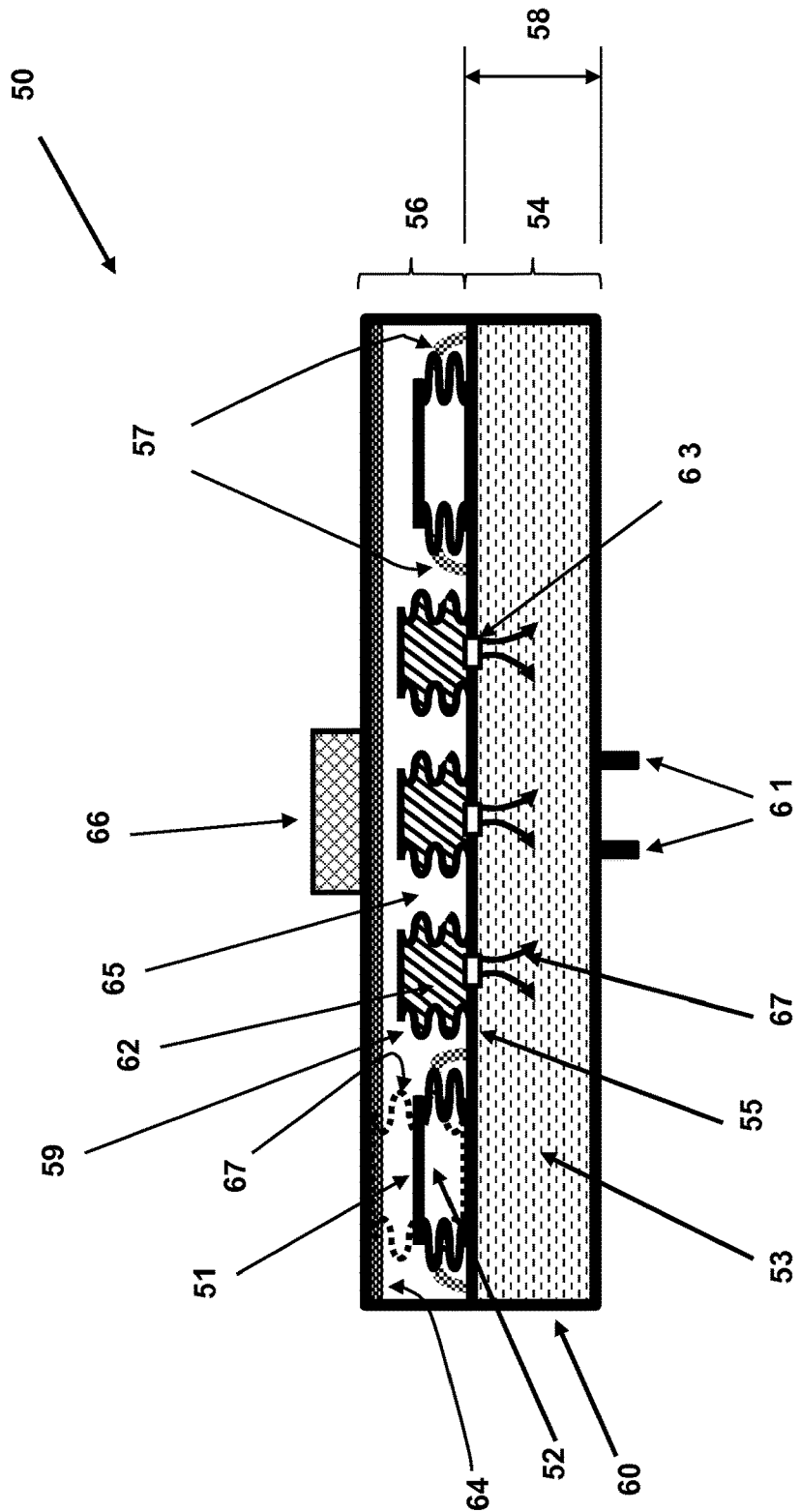
FIG. 3 illustrates a sectional schematic of a second variation of the pyrotechnic activated liquid reserve battery of FIG. 1.

The second modification to the embodiment 10 of FIG. 1 is illustrated schematically in the cross-sectional view of FIG. 3 and is indicated as the embodiment 50. It is noted that in the embodiments of FIGS. 1 and 2, the gasses filling up the battery cell cavities would provide certain amount of resistance to the inflow of the injected liquid electrolyte. This resistance can be minimized by providing certain level of relative vacuum (suction) ahead of the path of the liquid electrolyte exit. In the embodiment 50, the relative vacuum is generated by providing elastic and compressively preloaded (vacuum generating) elements such as bellow type elements 51 shown in the schematic of FIG. 3. The preloaded elements 51 (hereinafter referred to as "vacuum generating elements") are positioned in the liquid electrolyte and pyrotechnic material compartment 56. The preloaded vacuum generating elements 51 provide enclosed volumes 52 that are sealed with opening (not shown) only to the battery cell compartment 54 on the dividing member (plate) 55. The preloaded elements 51 can be fabricated with relatively heat resistant materials, such as stainless steel. The vacuum generating preloaded elements 51 may be bellow type or have any other appropriate shape such that that they could be preloaded elastically to significantly reduce their enclosing volume (52 in the elements 51) so that once they are released from their preloaded configuration; the enclosed volume is significantly increased. The preloaded elements 51 are held in their preloaded configuration shown in FIG. 3 by pyrotechnic material releasing elements 57 such as burnable fibers. Such elements 57 may also be covered with a pyrotechnic material.

The embodiment 50 of FIG. 3 is otherwise similar to the embodiment 30 of FIG. 2 and also operated similarly. The battery cell compartment 54 is relatively shallow, i.e., the depth of the battery cell compartment 58 is relatively small, thereby making the surface area of the battery cell electrodes 53 relatively large for a given volume of battery cell compartment 54 and reducing the length of the path that the injected liquid electrolyte has to travel inside the voids within the battery cell electrodes 53 to engulf the electrodes. A number of relatively small collapsible liquid electrolyte storage units 59 are distributed over the plate 55 separating the liquid electrolyte and pyrotechnic material compartment 56 from the battery cell compartment 58.

The battery compartment 54 is still where the battery electrodes are spaced with gaps to accommodate the battery liquid electrolyte. The liquid reserve battery body 60, the dividing plate 55 and other structures of the battery can be made out of relatively non-corrosive metal such as stainless steel. The liquid reserve battery 50 terminals are indicated by the numeral 61. The terminals 61 of the liquid reserve battery 50 may be located at any convenient location, such as being positioned on a surface of the battery cell compartment 54 to avoid running wires through the compartment 56.

In general, the body 60 and the compartments 54 and 56 of the liquid reserve battery 50 may have any convenient shape, preferably to match the available space in the munitions.

The collapsible storage units 59 can be relatively small but numerous, and can be uniformly distributed over the surface of the dividing plate 55. The collapsible storage units 59 must obviously contain enough liquid electrolytes 62 to flood the entire battery cell 53 cavities. Each collapsible storage unit 59 is provided with at least one outlet hole 63 in the dividing plated 55. The outlet holes 63 are sealed by relatively thin, such as metallic, diaphragms similar to the embodiment 10 of FIG. 1 (not shown in FIG. 3). Pyrotechnic materials 64, such as in a layer configuration as shown in the schematic of FIG. 3 are provided in the sealed volume 65 between the collapsible liquid electrolyte storage units 59 and the vacuum generating preloaded elements 51 and the compartment 54 walls. The liquid reserve battery 50 is also similarly provided with an initiation device 66 for igniting the pyrotechnic materials 64. The initiation device 66 is either of inertial, electrical, or other available types appropriate for the application at hand.

The liquid reserve battery 50 is activated by the initiation device 66 igniting the pyrotechnic materials 64. The burning pyrotechnic material 64 generates heat, which heats the stored liquid electrolyte 62 in all the collapsible storage units 59. The burning pyrotechnic material 64 also generates pressure within the sealed volume 65 by heating the enclosed gasses as well as by generating new gasses. The generated pressure would then act over the surfaces of all the collapsible liquid electrolyte storage units 59, forcing them to collapse, thereby forcing the pressurized and heated liquid electrolytes 62 to rupture the diaphragms separating them from the battery cell 53 and rapidly inject the heated liquid electrolytes 62 into the cavities between the battery cell 53 electrodes as shown by the arrows 67.

However, upon ignition of the battery pyrotechnic materials 64, the releasing elements 57 are released, such as by being burned, thereby releasing the preloaded vacuum generating elements 51. The preloaded vacuum generating elements 51 would then expand (shown with dotted line and indicated by the numeral 67 in FIG. 3) and generate a relative vacuum within their enclosed spaces 52, which are connected to the battery cell gas exit passage openings in the dividing plate 55 (not shown but similar to the openings 63—with or without rupturing thin diaphragms), thereby allowing the gasses within the battery cell 53 cavities that are being filled with the injected liquid electrolytes 62 to be sucked out into the expanding vacuum generating elements 51. The generated vacuum will then assist the inflow of the liquid electrolyte into the battery cell cavities. As a result, the reserve battery activation or rise time is further reduced.

The liquid reserve battery 50 is thereby activated very rapidly without the need for wicks or munitions spin or other additional means. In addition, the heating of the liquid electrolyte 62 (even if it is turned solid due to extreme cold temperatures) would allow activation of the liquid reserve battery 50 at very cold temperatures and ensures its high performance. The heating of the liquid electrolyte 62 would also enhance its diffusion rate inside the battery cell 53.

In the embodiment 50 shown schematically in FIG. 3, the releasing elements 57 are "fibers" that are brought into tension to keep the vacuum generating elements 51 in their preloaded state shown in FIG. 3. The initiation of the pyrotechnic materials 64 will then cause the elements 57 to burn, thereby releasing the preloaded vacuum generating elements 51.

The collapsible liquid electrolyte storage units 59 can be configured with a relatively large surface area to allow for rapid transfer of heat to the liquid electrolytes 62. The liquid electrolyte storage units 59 can also be configured to deform plastically under the generated pressure so that once the pressure has subsided, a minimal amount of the liquid electrolyte 62 is returned back to the storage units 59. Alternatively, particularly when the size of the battery allows, one-way valves (not shown) may be used to prevent the return of the liquid electrolyte 62 back to the liquid electrolyte storage unit 59. Such fluid one-way valves are well known in the art.

As indicated previously, in the embodiment 50 shown in the schematic of FIG. 3, the burning of the provided pyrotechnic material 64 will serve the following purposes. Firstly, it is used for battery activation, i.e., to release the stored liquid battery electrolyte 62 into the battery cell 53. Secondly, it generates heat, which is used to heat the liquid electrolyte 62 to allow the battery to function at very low temperatures and at the same time enhance its penetration rate into the battery cell 53 as well as its rate of diffusion. Thirdly, the pressure generated by the initiation of the pyrotechnic material 64 is used to inject the liquid electrolyte 62 into the battery cell 53 under pressure. Fourthly, the pressure generated by the initiation of the pyrotechnic material 64 is used to generate vacuum in the vacuum generating elements 51 to assist outflow of gasses occupying the voids inside the battery cell 53 between the electrodes that are to be filled with the liquid electrolyte 62, thereby minimizing resistance to the inflow of the liquid electrolyte 62 into the battery cell 53.

It will be appreciated by those skilled in the art that similar to the embodiments 10 and 30 of FIGS. 1 and 2, respectively, the rise time of these liquid reserve batteries is dependent on the length of the path of travel of the liquid electrolyte inside the battery cell. In the embodiment 50 of FIG. 3, the electrodes in the battery cell 53 are also considered to be positioned and spaced essentially in the vertical direction, thereby resulting in the void spaces to be filled with the liquid electrolytes to be essentially directed in the vertical direction. As a result, the maximum length of the path that the liquid electrolyte 62 that is injected into the battery cell 53 has to travel becomes essentially the height 58 of the battery cell compartment 54. This is the case since a considerable number of collapsible liquid electrolyte storage units 59 are considered to be distributed over the entire surface of the dividing plate 55. As a result, the pressurized and heated liquid electrolyte 62 has to travel a very short distance 58 to fill the cavities between the battery cell 53 electrodes while being assisted by the vacuum (suction) generated by the released vacuum generating elements 51, thereby the liquid reserve battery 50 can be activated even faster, i.e., have a faster rise time, than a similar embodiment 30 of FIG. 2.

In the embodiment 50, the releasing elements 57 of the vacuum generating elements 51 were indicated to be "fibers" that are brought into tension to keep the vacuum generating elements 51 in their preloaded state shown in FIG. 3. The initiation of the pyrotechnic materials 64 will then cause the elements 57 to burn, thereby releasing the preloaded vacuum generating elements 51. It will be, however, appreciated by those skilled in the art that numerous other methods and designs also exists that use heat to release a mechanism, for example shape memory alloys or bimetal based mechanisms, etc., and that any one of these methods may be used in the construction of the disclosed embodiment of the present invention. Furthermore, other means may be used to release the vacuum generated elements that do not utilize heat, such as mechanisms that activate upon a firing acceleration of the munition.

Figure 4:
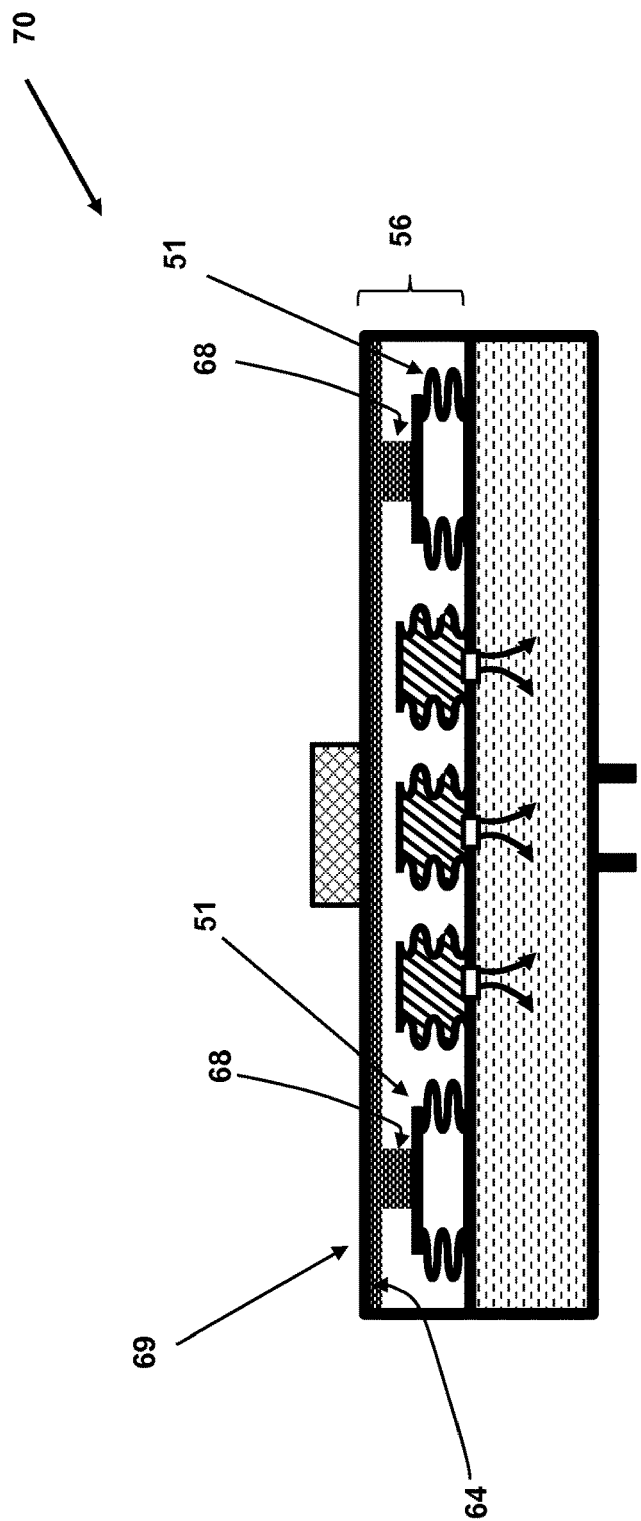
FIG. 4 illustrates a sectional schematic of a variation of the pyrotechnic activated liquid reserve battery of FIG. 3.

The vacuum generating elements 51 are released in the shortest possible time by using the pyrotechnic material itself to keep the vacuum generating elements 51 in its preloaded configuration. An example of such an embodiment 70 is shown in the schematic of FIG. 4. In the schematic of FIG. 4, all elements of the liquid reserve battery are the same as the embodiment 50 of FIG. 3, except for the vacuum generating elements 51 releasing elements 57, which are replaced by the pyrotechnic material "block" 68, which is positioned between the top surface of the vacuum generating elements 51 and the top surface 69 of the liquid electrolyte compartment 56. The pyrotechnic material used in the construction of the pyrotechnic block 68 must be strong enough to withstand the preloading force and may be constructed with adequate type and amount of binding agents and/or be provided with reinforcing fibers which are preferably easy to burn such as cotton fibers.

It will be appreciated by those skilled in the art that in all the above disclosed embodiments, the burning pyrotechnic materials will not only heat the liquid electrolyte before it is injected into the battery cell, but it would also transfer heat to the battery cell compartment afterwards. As a result, the activated liquid reserve battery is kept warm in a cold environment and can operate properly longer in environments with temperatures that are below the temperatures at which it can operate efficiently or is close or below its deactivation temperatures.

In certain applications, the liquid reserve battery is required to operate for a significant amount of time in temperatures that are below the effective operational temperature of the liquid reserve batteries, usually below 25 degrees F. In such cases, even though in the above embodiments illustrated schematically in FIGS. 1-4 the pyrotechnic materials initially heats the battery electrolyte before injecting it into the battery cell to activate the battery, in a very cold environment, the battery and its liquid electrolyte will cool down over time and eventually become deactivated when the liquid electrolyte temperature drops below the deactivation temperature or is at temperatures that are too cold for the liquid reserve battery to operate efficiently, i.e., at fill or required power. In such cases, one or more of the following modifications can be made to the design of each one of the above embodiments.

Figure 5:
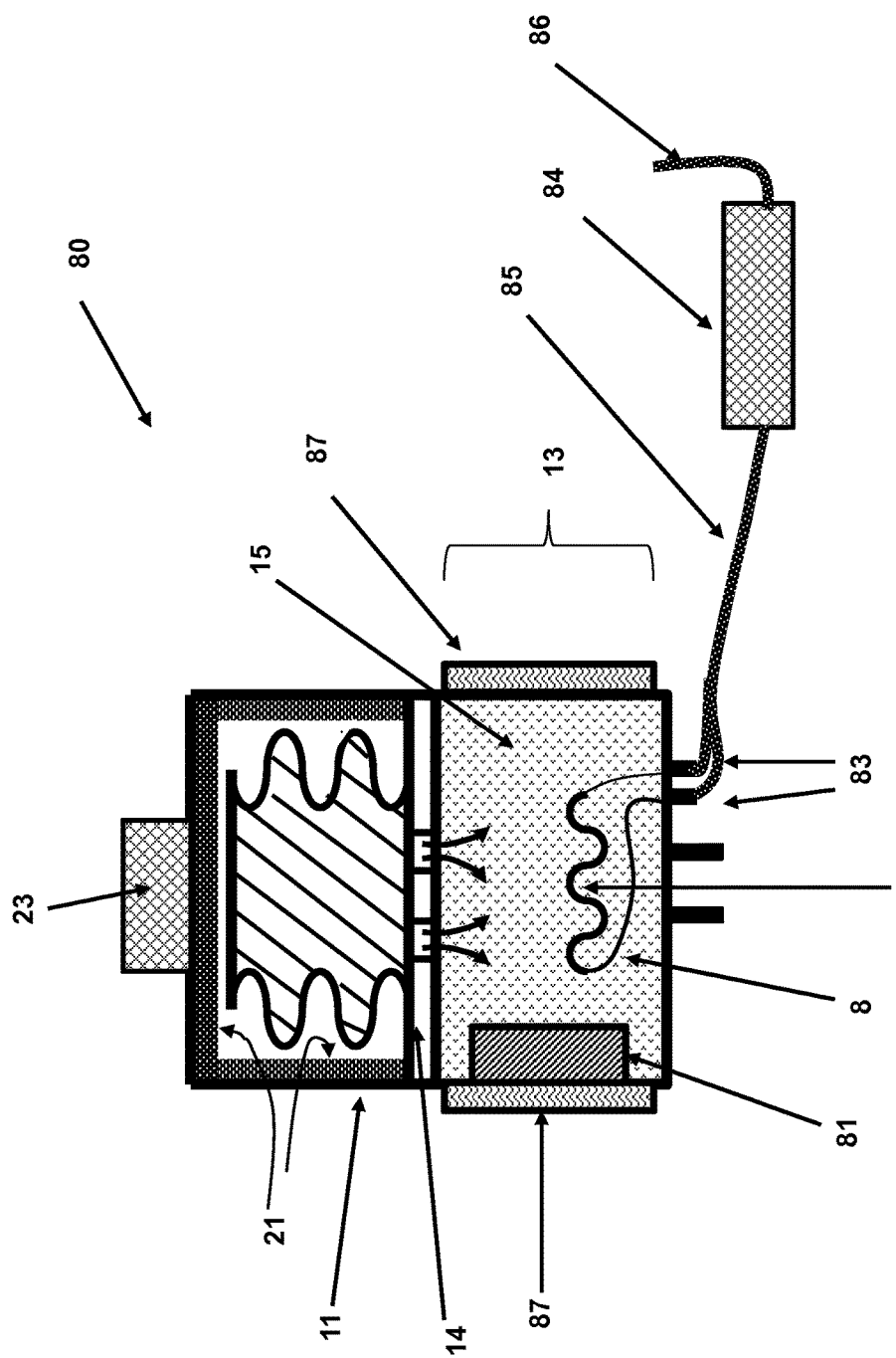
FIG. 5 illustrates sectional schematic of a third variation of the pyrotechnic activated liquid reserve battery of FIG. 1.

The embodiment 80 shown schematically in the cross-section view of FIG. 5 embodies three such run-time extending modifications to the embodiment 10 of FIG. 1. These three modifications may be used alone or as a combination to provide an optimal liquid reserve battery run time performance depending on the mission requirements. It will also be appreciated by those skilled in the art that one or more of these modifications may also be made to the embodiments 30, 50 and 70 of FIGS. 2-4, respectively. In the schematic of FIG. 5, all elements of the embodiment 80 are the same as those shown in the schematic of the embodiment 10 in FIG. 1 and are identically enumerated, except the elements added to achieve the run-time extending modifications as described below.

In the first of the modifications shown in the embodiment 80 of FIG. 5, a "heat storage" element 81 is provided that is heated by the heat generated by the pyrotechnic material 21 initiation during the liquid reserve battery activation. The heat storage element 81 is preferably made out of materials with high volumetric heat capacity that are either electrically non-conductive or are covered by a layer of electrically insulating material. The material must also be non-reactive to the liquid electrolyte. A good compromise may, for example, be ceramic. Then when the liquid reserve battery 80 is activated, the heat stored in the heat storage element 81 would keep the battery cell 15 and its liquid electrolyte above the operational temperature of the battery longer than it would without the heat storage element 81. As a result, the run-time of the liquid reserve battery is increased.

It is appreciated by those familiar with the art that the heat storage element 81 may be positioned anywhere within the battery cell 15 and even in the electrolyte compartment, including at or close to its wall surfaces of the battery cell 15. In one configuration, the separating plate 14 is used to serve for this purpose, particularly for the embodiments such as 30, 50 and 70 of FIGS. 2-4 that have relatively large such surface plates and battery cell 15 depths. The separating plate 14 can be constructed with materials with high volumetric heat capacity and appropriate amount of volume (mass). The use of the separating plate 14 as the heat storage element 81 has the advantage that it is close to the heat source and occupies minimal or no additional battery volume, thereby leads to the construction of volumetrically more efficient liquid reserve batteries. In such applications, the surfaces of the separating plate 14 facing the pyrotechnic materials is preferably increased by making it rough or by providing ridges or fins to increase its surface area, thereby allowing the separating plate 14 to absorb and store more heat.

In the second of the aforementioned modifications shown in embodiment 80 of FIG. 5, at least one electrical heating coil element 82 is provided. The terminals of the heating coil element 82 are indicated with numerals 83 and connected to a power control system 84 by wires 85 such that when the voltage and/or current and/or power provided by the battery 80 drops below a predetermined amount (such as the performance level of the battery), electrical power (from the battery 80 or other power sources) is diverted to the coil 82 (the input power line to the power control system 84 is shown by the numeral 86) to heat the battery cell 15 and its liquid electrolyte. Alternatively and particularly for relatively larger liquid reserve batteries, a temperature sensor (not shown) may be used to determine when to power the coil element 82 and how much power to provide to the coil. Furthermore, such as for irregular shaped batteries 80, several sensors/heaters may be employed in the battery cell 15 to ensure that all portions of the same are operating efficiently.

In the third of the aforementioned modifications shown in embodiment 80 of FIG. 5, at least one pyrotechnic material filled container 87 is provided and can be positioned around the outer surface of the battery cell compartment 13 of the liquid reserve battery. Then when the voltage and/or current and/or power provided by the battery 80 drops below the predetermined amount, such as a performance level of the battery, the pyrotechnic material inside at least one of the containers 87 is igniter (preferably by an electrical igniters—not shown) to heat the battery cell 15 and its liquid electrolyte. Alternatively and particularly for relatively larger liquid reserve batteries, a temperature sensor (not shown) may be used to determine when the at least one pyrotechnic materials filled container 87 must be ignited.

In many applications, the liquid reserve battery is required to provide full or close to full power a very short time after initiation. This capability is particularly challenging when the reserve battery is at very low temperatures such as the aforementioned −65 degrees F. For this reason, the electrolyte must be at relatively high temperature before it is injected into the battery cell since it is also required to provide the required amount of heat to rapidly heat the cell elements while staying warm enough to ensure proper operation of the reserve power source. The following embodiments are modifications of the embodiment 10 of FIG. 1 to provide such a capability to liquid reserve batteries. As will be shown, the provided capabilities allows liquid reserve power sources to provide full power in a relatively short time following initiation as well as to keep the reserve power source fully active longer even in a very cold environment.

Figure 6:
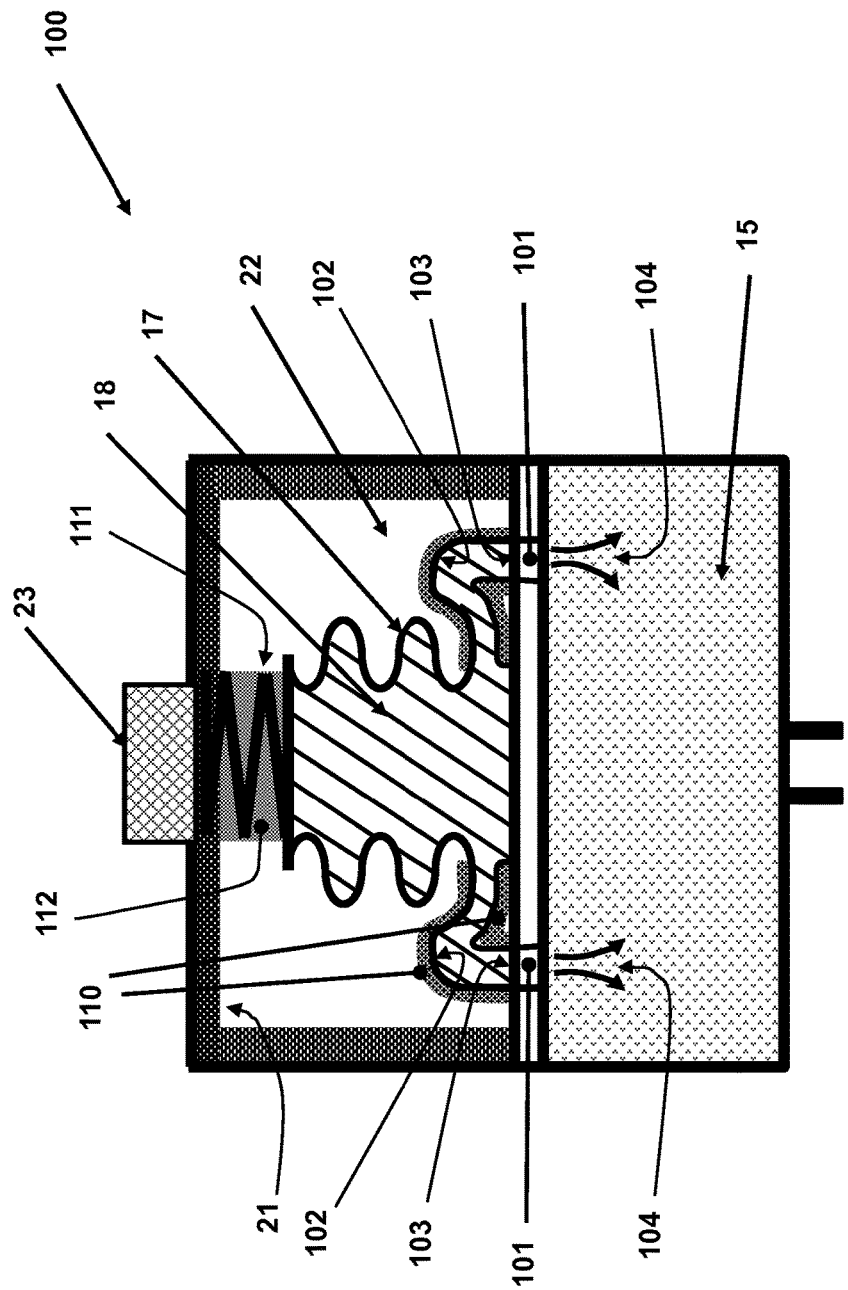
FIG. 6 illustrates a sectional schematic of a fourth variation of the pyrotechnic activated liquid reserve battery of FIG. 1 with electrolyte liquid heated in a heat-exchanger element prior to injection into the battery cell.

The embodiment 100 shown schematically in the cross-section view of FIG. 6 embodies one such fast activation and run-time extending modification to the embodiment 10 of FIG. 1. It will be appreciated by those skilled in the art that one or more of these modifications may also be made to the embodiments 30, 50 and 70 of FIGS. 2-4, respectively. In the schematic of FIG. 6, all elements of the embodiment 100 are the same as those shown in the schematic of the embodiment 10 in FIG. 1 and are considered to be identically enumerated, except the elements added or modified which are enumerated accordingly in FIG. 6 and as described below.

In the first of the modification shown in the embodiment 100 of FIG. 6, the at least one outlet hole 19 (see FIG. 1) is eliminated, thereby preventing the electrolyte 18 stored in the liquid electrolyte storage unit 17 to be directly discharged into the battery cell 15 upon the battery initiation as was previously described. At least one alternative outlet holes (ports) 101 are then provided as shown in FIG. 6, to allow the electrolyte 18 stored in the liquid electrolyte storage unit 17 to be discharged via the "heat exchanger elements" 102.

The aforementioned "heat exchanger elements" 102 may be constructed using any number of well-known shapes and structures commonly used in the design and construction of heat exchangers. As is well known in the art, such heat exchangers are designed to efficiently transfer heat from the outside of the heat exchanger, in this case from the sealed volume 22 to the fluid (in this case the electrolyte 18) through the heat exchanger (in this case the heat exchanger 102) through a combination of conduction and convection processes. For this reason, the surface area of the heat exchanger is desired to be as large as possible to maximize the heat transfer rate. The outside surfaces of the heat exchanger may also be provided, at least partially with fins elements.

In the present liquid reserve battery embodiment of FIG. 6, this goal can be accomplished by providing the heat exchanger element 102 with relatively large surface areas. This can be done in numerous ways, two examples of which are provided here without intending to limit the options to the indicated designs.

In the first example, the at least one heat exchanger element 102 is essentially a relatively long tube which is attached to a lower side of the liquid electrolyte storage unit 17 as shown in the schematic of FIG. 6. Then, when the reserve battery 100 is initiated and its internal pyrotechnic materials 21 are ignited to generate pressure inside the sealed volume 22 as well and heat the liquid electrolyte storage unit 17, thereby heating the liquid electrolyte 18, the surfaces of the at least one heat exchanger element 102 are also heated, thereby further heating the fluid electrolyte 18 inside the at least one heat exchanger element 102 as well as further heating the fluid electrolyte 18 as it passes through the at least at one heat exchanger element 102. It is noted that as was previously described for the embodiment 10 of FIG. 1, the pressure generated by the initiation of the initiation device 23 and the pyrotechnic material, some of which may be mostly of gas generating type, would act over the surface of the at least one collapsible liquid electrolyte storage unit 17, forcing it to collapse, thereby forcing the pressurized liquid electrolyte 18 to rupture the diaphragm(s) 103 separating it from the battery cell 15 and rapidly injecting the heated liquid electrolyte 18 into the cavities between the battery cell 15 electrodes as shown by the arrows 104. The liquid reserve battery 100 is thereby activated very rapidly without the need for wicks or munitions spin or other additional means. In addition, the heating of the liquid electrolyte 18 (even if it is turned solid due to extreme cold temperatures) would allow activation of the liquid reserve battery 100 at very cold temperatures and ensures its high performance. The heating of the liquid electrolyte 18 would also enhance its diffusion rate inside the battery cell 15. It will be appreciated by those skilled in the art that the relatively long heat exchanger tube(s) 102 may have any cross-sectional shape, including circular, oval, etc., but to provide larger surface area for a given cross-sectional area to increase the rate of heat transfer to the electrolyte fluid, a relatively flat oval shaped cross-sectional area can be used. Here, by flat, it is meant oval shapes in which the semi-major of the elliptical cross-section is significantly longer than its semi-minor axis. Such cross-sectional shapes are also readily manufactured. In addition, depending on the amount of heat to be transferred to the passing liquid electrolyte and the limitations on the length of the heat exchanger element due to space availability, the heat exchanger may be corrugated or provided with external fin rings (not shown) commonly used in tubular heat exchangers to increase the heat transfer rate to the passing liquid electrolyte.

In the another example shown in the cross-sectional view and base view of FIGS. 7A and 7B, respectively, the heat exchanger element 105 can essentially be an integral part of the collapsible liquid electrolyte storage unit 106. The resulting heat exchanger integrated collapsible liquid electrolyte storage unit 107 can be made symmetric about the long axis of the unit as shown in the longitudinal cross-sectional view of FIG. 7A and the base view of FIG. 7B. The base plate 108 of the unit 107 is then provided with at least one port 109 (four such ports are shown in the view of FIG. 7B) to provide outlet holes (ports) similar into the battery cell (similar to ports 101 and 19 of FIGS. 7 and 1, respectively). One of the advantages of the embodiment 100 of FIG. 6 with the heat exchanger integrated collapsible liquid electrolyte storage unit 107 of FIGS. 7A and 7B is that it can be readily manufactured, particularly by seam welding of preformed layers as will be described later in this disclosure. In addition, it provides a relatively large heat exchanger surface area; the heat exchanger portion 105 of the integrated unit 107 can be designed to be partially collapsible, thereby assisting in the process of injecting the heated liquid electrolyte 18 into the battery cell 15; can provide multiple and properly distributed outlet holes (ports) to ensure a uniform and rapid distribution of the injected liquid electrolyte within the battery cell, thereby accelerating the process of battery activation.

It will be appreciated by those skilled in the art that, when in the embodiment 100 of FIG. 6, the heat exchanger integrated collapsible liquid electrolyte storage unit 107 of FIG. 7A is used, then the relatively rigid plate 14 separating the compartments 12 and 13 of the battery (see the embodiment of FIG. 1) may be an integral part of the unit 107, i.e., form the base 108 of the heat exchanger integrated collapsible liquid electrolyte storage unit 107.

When it is desired to provide more heat to the liquid electrolyte 18 as it passes through the heat exchangers 102 or 105 of FIGS. 6 and 7A, respectively, the outer surfaces of the heat exchangers may be covered by additional heat generating pyrotechnic material 110 as shown in the schematic of FIG. 6.

In addition, the embodiment 100 of FIG. 6 may be provided with a compressively preloaded spring 111 between the collapsible liquid electrolyte storage unit 17, FIG. 1 (or the unit 106 of FIG. 7A) and the reserve battery body 11 as shown in the schematic of FIG. 6. To prevent the compressively preloaded spring 111 from applying pressure to the collapsible liquid electrolyte storage unit (17 or 106), readily combusting fabrics such as soft cotton fabrics and pyrotechnics materials 112, which can be provided with any one of the known organic binders used in pyrotechnic materials, can be used to firmly hold the spring 111 in its compressively preloaded condition. Then, upon initiation of the reserve battery (10 and 100 of FIGS. 1 and 6, respectively), the pyrotechnic material and holding fabric combination 112 are also ignited, thereby releasing the compressively preloaded spring 111. The compressively preloaded spring 111 will then further assist the pressurized compartment 12 to collapse the collapsible liquid electrolyte storage units to inject the heated electrolyte fluid 18 into the battery cell 15.

Figure 8B:
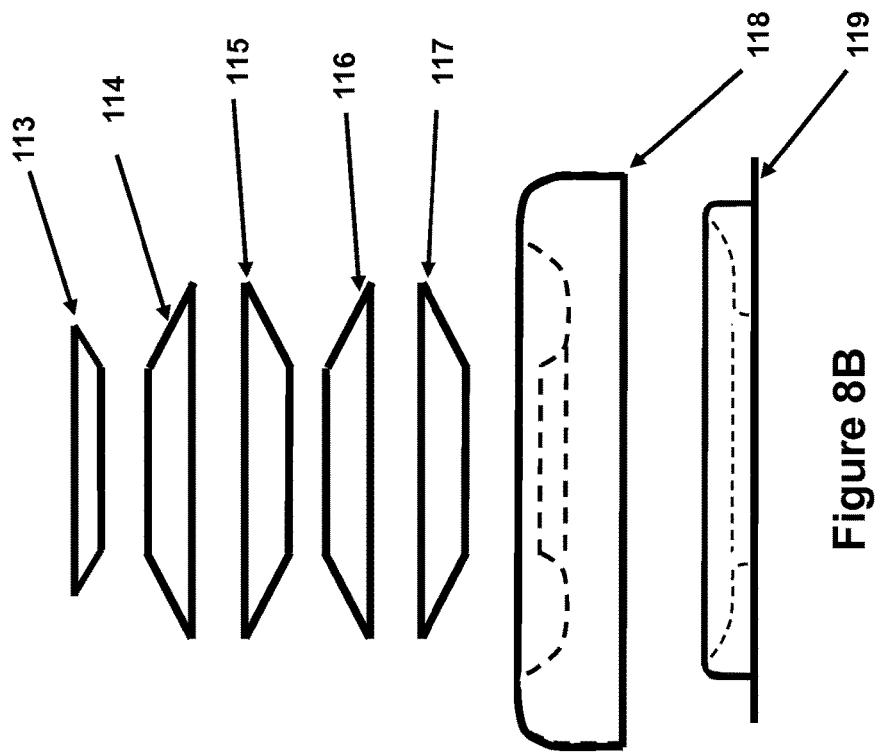
FIG. 8B illustrates the formed components used in the construction of the liquid electrolyte storage unit with integral heat exchanger of FIG. 8A.
Figure 8A:
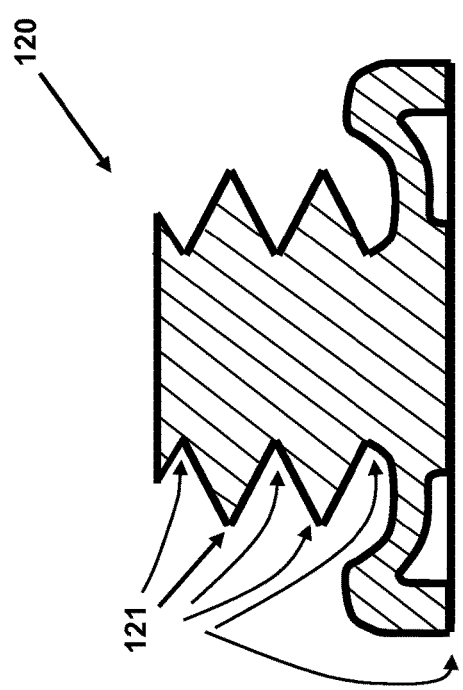
FIG. 8A illustrates the construction of a liquid electrolyte storage unit with integral heat exchanger constructed with formed and seam welded elements for low cost manufacture.

As was previously indicated, the heat exchanger integrated collapsible liquid electrolyte storage unit 107 of FIG. 7A (and similarly the collapsible liquid electrolyte storage unit 17 of FIG. 1) may be manufactured by seam welding of preformed layers (sections) at relatively low cost. The cross-sectional view of an example of a heat exchanger integrated collapsible liquid electrolyte storage unit of this type 120 which is constructed very similar in shape to the heat exchanger integrated collapsible liquid electrolyte storage unit 107 of FIG. 7A is shown in FIG. 8A. The aforementioned preformed sections 113, 114, 115, 116, 117, 118 and 119, which are seam welded to form the heat exchanger integrated collapsible liquid electrolyte storage unit 120 of FIG. 8A, are shown in FIG. 8B. The six seams 121 between the above seven preformed sections 113-119 to be welded are indicated in the schematic of FIG. 8A.

In addition, in certain applications, such as when the battery may be used at relatively high as well as very cold temperatures, and if the amount of heat generated by all pyrotechnic materials provided in the compartment 12 (including the pyrotechnic materials 110, FIG. 6, over the heat exchanger surfaces) for heating of the liquid electrolyte 18 may be excessive when the battery is activated at elevated temperatures, then a portion of the pyrotechnic material (which can include pyrotechnic material 110 covering the heat exchanger surfaces) can be covered by heat insulating material (such as a relatively thick layer of silica or carbide powder with any organic binder commonly used for such purposes as is well known in the art). In such configuration, a temperature sensor can be provided (not shown) inside or outside of the battery and used to initiate the ignition protected (heat insulation covered) pyrotechnic material via provided electrical initiation elements (such as the regularly used filaments) as is well known in the art.

It will also be appreciated by those skilled in the art that the at least one heat exchanger "tube" element 102 could be extended into the cell 15 compartment 13 (see FIG. 1) thereby providing heat to the cell 15 as well as injecting the liquid electrolyte 18 further into the core of the battery cell 15.

It will further yet be appreciated by those skilled in the art that the battery cell 15 may be heated internally by heat generating pyrotechnic materials as can be seen in the embodiment 130 of the schematic of FIG. 9. The embodiment 130 shown schematically in the cross-section view of FIG. 9 illustrates a fifth modification to the embodiment 10 of FIG. 1. It will also be appreciated by those skilled in the art that one or more of these modifications may also be made to the embodiments 30, 50 and 70 of FIGS. 2-6, respectively. In the schematic of FIG. 6, all elements of the embodiment 100 are the same as those shown in the schematic of the embodiment 10 in FIG. 1 and are considered to be identically enumerated, except the elements added or modified which are enumerated accordingly in FIG. 9 and as described below.

In the embodiment 130 of FIG. 9, the liquid reserve battery is provided with at least one heat exchanger tube 122 similar to the heat exchanger elements 102 of the embodiment of FIG. 6, which is at least partially filled with heat generating pyrotechnic material 123. The pyrotechnic material 123 may be provided with its separate initiation (such as an electrical initiation) element (not shown), or can be ignited by the initiated pyrotechnic material 21 inside the compartment 12 of the battery (see FIG. 1) following the reserve battery initiation as was previously described for the embodiment 10 of FIG. 1. In such configuration, an end 124 of the heat exchanger tube 122 can be closed, while its other end 125 is open into the sealed volume 22 of the compartment 12 of the battery. Then, the pyrotechnic material 123 inside the heat exchanger tube 122 will be ignited by the initiated pyrotechnic material 21 following the battery initiation. Otherwise, the pyrotechnic material 123 may be initiated separately by its own initiation device as was previously indicated, such as via an input from the aforementioned temperature sensor(s) if extra heat is required for heating the battery core 15 for its proper operation.

It will be appreciated by those skilled in the art that the at least one heat exchanger tube 122 may be required to be made out of, or be covered by, electrically nonconductive material to ensure proper operation of the battery cell. In addition, the at least one heat exchanger tube 122 may have any appropriate cross-sectional area and can be small in cross-section and long enough and "wound around" the interior of the cell 15 to nearly uniformly heat the battery cell volume 15.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A liquid reserve battery comprising:
a collapsible storage unit having a liquid electrolyte stored in an interior of the collapsible storage unit, the collapsible storage unit being collapsible from a first volume to a second volume, where the second volume is smaller than the first volume, the collapsible storage unit having one or more conduits extending from the interior of the collapsible storage unit to an outlet of the one or more conduits to pass the liquid electrolyte from the interior of the collapsible storage unit to a battery cell;
the battery cell having an inlet in communication with the outlet of the one or more conduits, the battery cell having gaps dispersed therein;
a first pyrotechnic material disposed adjacent the collapsible storage unit such that initiation of the first pyrotechnic material provides pressure to collapse the collapsible storage unit from the first volume to the second volume and to heat and force the liquid electrolyte through the outlet and into the gaps; and
a second pyrotechnic material disposed to at least partially surround the one or more conduits such that initiation of the second pyrotechnic material heats the one or more conduits and the liquid electrolyte therein passing through the one or more conduits to the battery cell;
wherein the one or more conduits comprises a plurality of conduits, and the outlet comprising a plurality of outlets, each corresponding to one of the plurality of conduits.

2. The liquid reserve battery of claim 1, further comprising an initiator device having an output in communication with the first pyrotechnic material for initiating the first pyrotechnic material upon a firing event.

3. The liquid reserve battery of claim 2, wherein the firing event is an acceleration with at least a predetermined duration and magnitude.

4. The liquid reserve battery of claim 1, further comprising a body having a first compartment to contain the battery cell and a second compartment to contain the collapsible storage unit and the first pyrotechnic material, the body further having a separating plate dividing the first and second compartments.

5. The liquid reserve battery of claim 4, wherein the separating plate is integrally formed with the collapsible storage unit.

6. The liquid reserve battery of claim 1, further comprising a diaphragm associated with the inlet of the battery cell, the diaphragm being configured to burst upon collapse of the collapsible storage unit.

7. The liquid reserve battery of claim 1, further comprising a heat insulating material disposed on the second pyrotechnic material such that the second pyrotechnic material is not initiated with the initiation of the first pyrotechnic material.

8. The liquid reserve battery of claim 1, wherein the collapsible storage unit is formed of a plurality of annular portions and the plurality of annular portions are connected to each other by a welded seam.

9. The liquid reserve battery of claim 1, wherein the plurality of conduits are evenly distributed about a peripheral surface of the collapsible storage unit.

10. The liquid reserve battery of claim 1, further comprising a compression element for exerting a force on the collapsible storage unit which tends to collapse the collapsible storage unit to further force the liquid electrolyte through the plurality of outlets and into the gaps.

11. The liquid reserve battery of claim 10, further comprising an element for maintaining the compression element in a preloaded state wherein the compression element is released from its preloaded state upon initiation of the first pyrotechnic material to further force the liquid electrolyte through the plurality of outlets and into the gaps.

* * * * *